(12) United States Patent
Becker et al.

(10) Patent No.: US 8,011,708 B2
(45) Date of Patent: Sep. 6, 2011

(54) ROBOT GRIPPER AND METHOD FOR ITS MANUFACTURE

(75) Inventors: Ralf Becker, Marbach (DE); Andrzej Grzesiak, Stuttgart (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 633 days.

(21) Appl. No.: 11/992,542

(22) PCT Filed: Sep. 1, 2006

(86) PCT No.: PCT/EP2006/008555
§ 371 (c)(1),
(2), (4) Date: Apr. 29, 2008

(87) PCT Pub. No.: WO2007/036280
PCT Pub. Date: Apr. 5, 2007

(65) Prior Publication Data
US 2009/0108605 A1    Apr. 30, 2009

(30) Foreign Application Priority Data

Sep. 27, 2005    (DE) .......................... 10 2005 046 160

(51) Int. Cl.
*B25J 15/08* (2006.01)
(52) U.S. Cl. ............................ 294/88; 294/99.1; 901/37
(58) Field of Classification Search .................... 294/88, 294/99.1; 901/37; 269/25, 32–34
See application file for complete search history.

(56) References Cited

U.S. PATENT DOCUMENTS

| 4,768,428 | A | * | 9/1988 | Silvestrini et al. | .............. 99/551 |
| 5,046,773 | A | | 9/1991 | Modesitt | |
| 5,263,753 | A | * | 11/1993 | Breu et al. | ................... 294/99.1 |
| 5,529,359 | A | * | 6/1996 | Borcea et al. | ................... 294/88 |
| 5,637,200 | A | * | 6/1997 | Tsymberov | .............. 204/298.15 |

FOREIGN PATENT DOCUMENTS

| DE | 44 32 253 A1 | 3/1996 |
| DE | 102 35 427 A1 | 2/2004 |
| EP | 0 441 060 A2 | 8/1991 |
| EP | 0 764 503 B1 | 3/1997 |

OTHER PUBLICATIONS

International Search Report (PCT/ISA/210).

\* cited by examiner

*Primary Examiner* — Dean J Kramer
(74) *Attorney, Agent, or Firm* — Buchanan Ingersoll & Rooney PC

(57) ABSTRACT

The invention relates to a robot gripper having a fixing flange for detachably attaching it to a robot manipulator arm, and at least one actuator element which is supported in a frame, that actuates at least two gripper jaws indirectly or directly kinematically via at least one articulated unit. At least the fixing flange, the frame and the actuator element are manufactured integrally using a generative manufacturing method, and the actuator element is in the form of a bellows, enclosed an internal volume, which can be filled with a medium via at least one opening, and is capable of expanding, when filled with a medium, along a linear axis predetermined by the bellows design of the actuator element and of contracting, when the volume is emptied, in the opposite direction.

6 Claims, 4 Drawing Sheets

ROBOT GRIPPER AND METHOD FOR ITS MANUFACTURE

TECHNICAL FIELD

Figure 1:
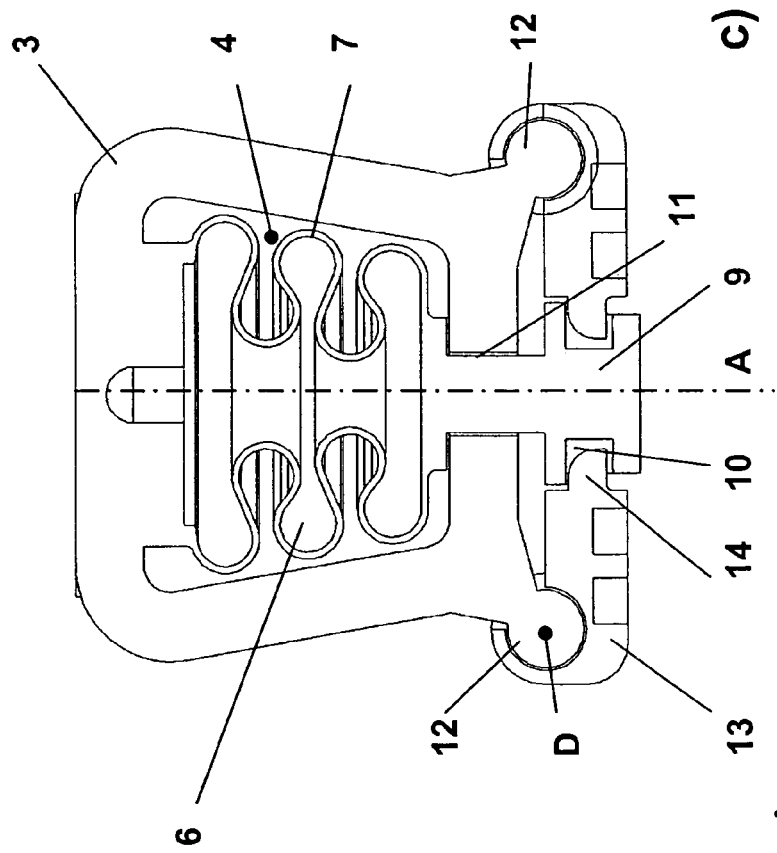
Figure 1:
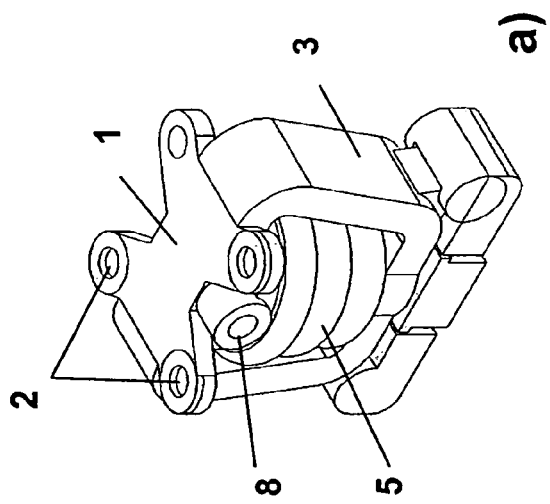
Figure 1:
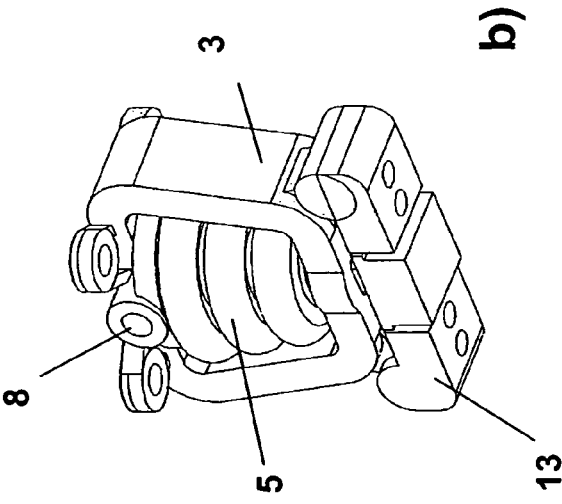

The invention relates to a robot gripper having a fixing flange for detachably attaching it to a robot manipulator arm, and at least one actuator element which is supported in a frame, that actuates at least two gripper jaws indirectly or directly kinematically via at least one articulated unit.

PRIOR ART

Robot grippers are required in automated industrial handling for transporting, positioning or the manipulation of or on workpieces, which for example between individual process stages must be moved from conveying devices to machines, devices or packaging units where they are stored in a specific way. Such grippers are typically fixed to robot arms or to the end regions of linear or rotational drives, but are also used as permanently mounted clamping devices, for example for laser-labelling arbitrary components.

The use of robot grippers on robots or other movable axles requires the weight of a gripper to be kept as low as possible, in order not to place too great a demand from inertial forces on the high acceleration levels presently found in industry.

Robot grippers find many different application areas, for which reason there is an abundance of variants of these devices ranging from purely mechanical systems via the use of magnetic effects right up to vacuum-supported designs, and moreover being capable of extending to other operating principles. The following designs are restricted to purely mechanical grippers, in which using a linear motion or a tilting motion of gripper fingers or gripper jaws an appropriately shaped component can be grasped with a positive or force fitting, in the manner of clamping in a vice. The category of mechanical grippers customarily distinguishes so-called parallel-jaw grippers and angular grippers. Parallel-jaw grippers are standardly fitted with two, three or four gripper jaws, of which at least one gripper jaw is movable linearly towards or away from a centre, in order to clamp the component. Angular or swiveling grippers are by contrast fitted with gripper jaws of which at least one gripper jaw is moved about an axis on a centre towards or away from the latter, in order to clamp the component accordingly.

Normally, mechanical grippers consist of different modules, the production of which is done by modular joining together individual parts and modules. Thus mechanical grippers typically comprise a housing with a compressed air connection, a piston with sealing rings, a push rod, a reset spring, various rotational axes or linear guides, gripper jaws with threaded holes and holes for centre sleeves. The aforementioned components/modules are joined together in a plurality of individual assembly stages under strict quality control, in order ultimately to obtain a gripper with the desired freedom of movement and durability.

Industry-standard grippers are subject however to a certain amount of wear to seals, bearings and guides, which is the dominant factor particularly in those cases in which the quality of the assembled components and that of the assembly itself is too low. Consequently their manufacture requires both cost-intensive assembly as well as reliable quality control.

Despite the existing high quality requirements on mechanical gripper systems, which ultimately can only be satisfied by cost-intensive measures with regard to the quality of the components themselves and with regard to the assembly, for reasons based on the constraints of competition there is a requirement to keep the manufacturing costs as low as possible, which means individual sizes and customized variants for specific gripping tasks cannot be offered for the design of such grippers for reasons of cost. More commonly in a gripper model range, graded sizes are offered that are available with gripper jaws with standard connections, such as a flanged surface with threaded holes and centering options. On the customer's part modifications based on the requirements of the grippers must also be made, for example constructing specific gripper fingers to fit the commercially available grippers, which must be constructionally modified to suit the respective individual gripping tasks. It is also necessary to mount the individually constructed gripper fingers on the conventionally available gripper platforms. Such an expense, in particular when handling small quantities, can become excessive in comparison to the overall gripper system, so that many types of gripping tasks cannot be automated due to reasons of cost.

In addition is the fact that the individual modifications to be made lead to modules that are not weight-optimized and thus adversely affect the performance of conventionally produced gripper platforms.

DE 44 32 253 A1 discloses a mechanism for motion and force transmission, in particular in the form of a pair of micro-gripping forceps, which has both a mechanically and materially integral form and according to a described exemplary embodiment comprises a volume, which can be filled with a medium in order to carry out the forceps function.

Additionally, DE 102 35 427 A1 describes a device along with a method for manufacturing three-dimensional objects using a generative production method. In this device, three-dimensional objects are created using a constituent material which solidifies in layers by the use of electromagnetic or particle irradiation.

In EP 0 764 503 B1 and U.S. Pat. No. 5,046,773 gripper tools are disclosed, the gripper function of which is effected by a controlled expansion and compression of an actuator element in the form of a bellows.

DESCRIPTION OF THE INVENTION

The problem addressed by the invention is to extend a robot gripper of the type previously described with a fixing flange for detachably attaching it to a robot manipulator arm, and with at least one actuator element which is supported in a frame, that actuates at least two gripper jaws indirectly or directly kinematically via at least one articulated unit, in such a way that the manufacture of such a robot gripper is simplified, cheaper and faster in comparison to the assembly techniques used to date. It should thus be possible to manufacture a robot gripper individually adapted to a specific gripping task even in very low quantities at an economically viable cost, and this with a gripper quality which in no way compromises on the functionality or the service lifetime of the gripper system. It should thus moreover also be possible to manufacture a robot gripper to any chosen scaling, without having to accept a large outlay in terms of assembly effort and cost.

The solution to the problem addressed by the invention is disclosed in claim 1.

According to the solution a robot gripper with the features of the preamble of claim 1 is characterized by the fact that at least the fixing flange, the frame and the actuator element are manufactured integrally using a generative manufacturing method, and that the actuator element is in the form of a bellows, encloses an internal volume, which can be filled with a medium via at least one opening, and is capable of expanding, when filled with the medium, along a linear axis predetermined by the bellows-type design of the actuator element and of contracting, when the volume is emptied, in the opposite direction.

Generative manufacturing methods enable the three-dimensional construction of objects directly based on pre-specified constructional CAD data in a single manufacturing process in such a way that after the manufacturing process has finished the three-dimensional object is fully functional and ready for use without further assembly effort. Thus according to the solution, the components of a robot gripper, namely the fixing flange, the frame and the actuator element can be manufactured integrally and as a single piece by using a generative manufacturing method, so that based on a customer-specific CAD data set describing a robot gripper, robot grippers tailored to specific needs can be manufactured. Depending on the wishes and requirements of the customer, gripper systems can be manufactured with and without gripper jaws, and which can also be scaled to any size and thereby adapted to specific gripper requirements. Due to the fundamental freedom with regard to size and shape of the robot grippers, using suitable construction grippers can be made having an optimized weight, and thus guaranteeing a freedom of movement when used with highly dynamic robot arms.

Generative production methods offer enormous design freedoms, especially as there is no need to take account of constructionally dependent final shape slopes, undercuts or invariant wall thicknesses. It is possible in fact, by variation of the wall thickness of components to provide highly rigid and elastic regions and to combine these directly together.

Relative to conventional assembly techniques, the total costs can be considerably reduced compared with conventional systems on the market. Another application of the robot grippers according to the solution could be their use in fully automated production runs, in which the production lines independently adjust themselves to the respective parts to be produced. Automata are also capable of autonomously and independently producing the gripper systems necessary for the handling, putting them into operation and recycling them again after the completion of the batch run.

Possible examples of generative production methods include for example Rapid Prototyping, which by means of a photolithographic system is capable of inscribing three-dimensional object structures by a targeted local application of energy within a material. In this system the photolithographic illumination process mostly takes place in layers within a body consisting of a photosensitive material, which by means of illumination in specific material regions undergoes a material transformation, for example using a targeted polymerization or fusion. Additionally, polymerization processes are known involving layered hardening within a liquid bath, in order to produce three-dimensional objects. It is also possible to generate relevant objects by the layered application and solidification of powder layers.

In the following, by reference to the appended figures two exemplary embodiments will be described, illustrating two concrete robot grippers, which can be manufactured by a generative manufacturing method.

SHORT DESCRIPTION OF THE INVENTION

The invention will now be described using examples without limitation of the general concept of the invention with the aid of exemplary embodiments and making reference to the drawings.

Figure 2:
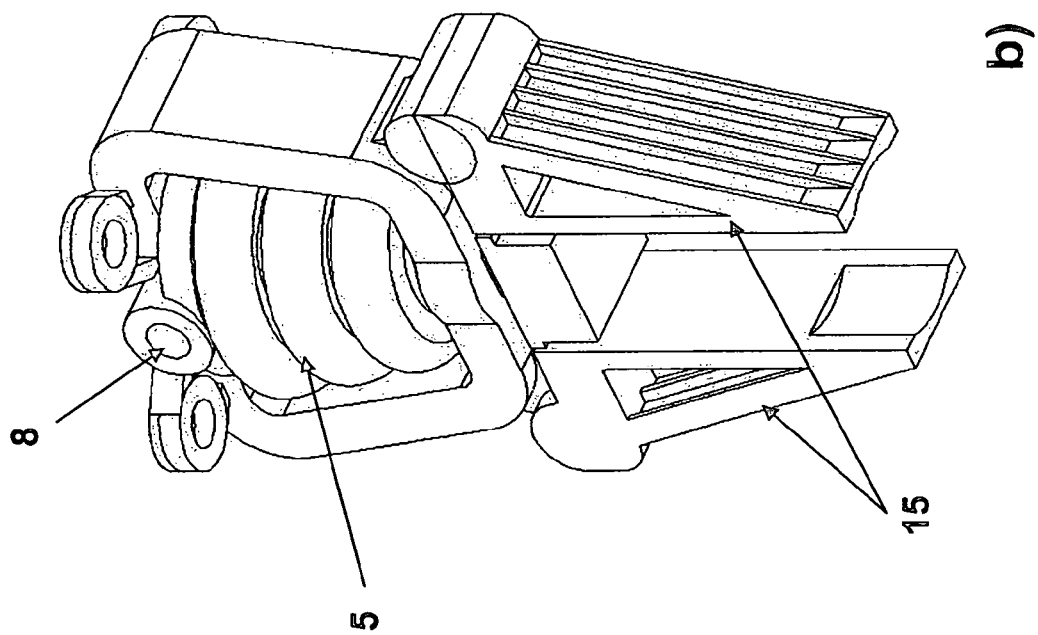
Figure 2:
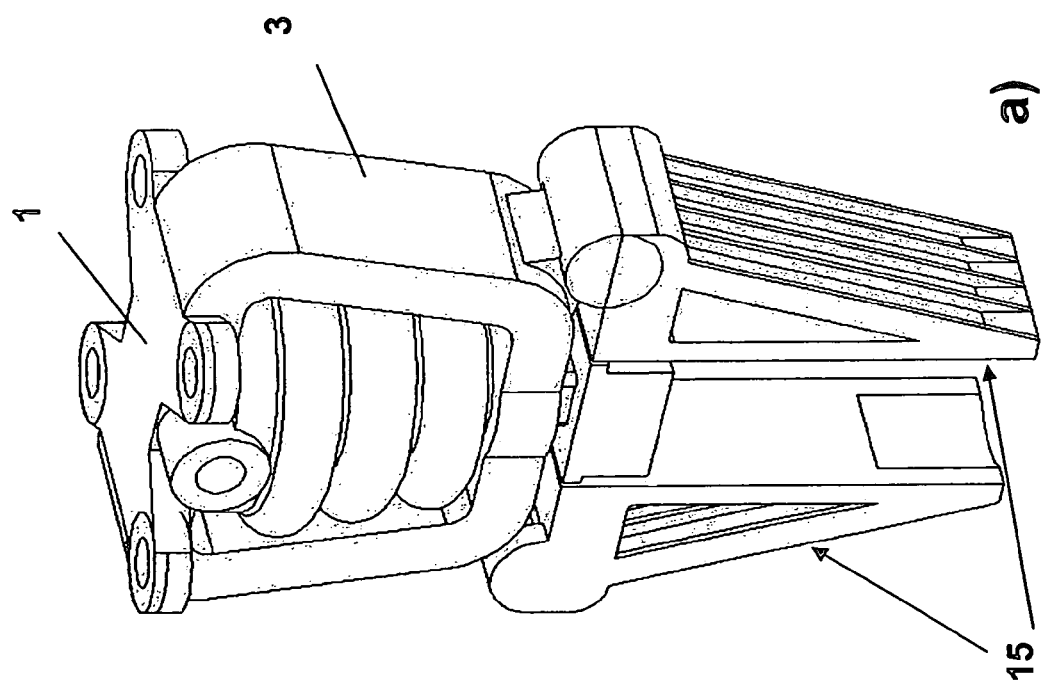
Figure 3:
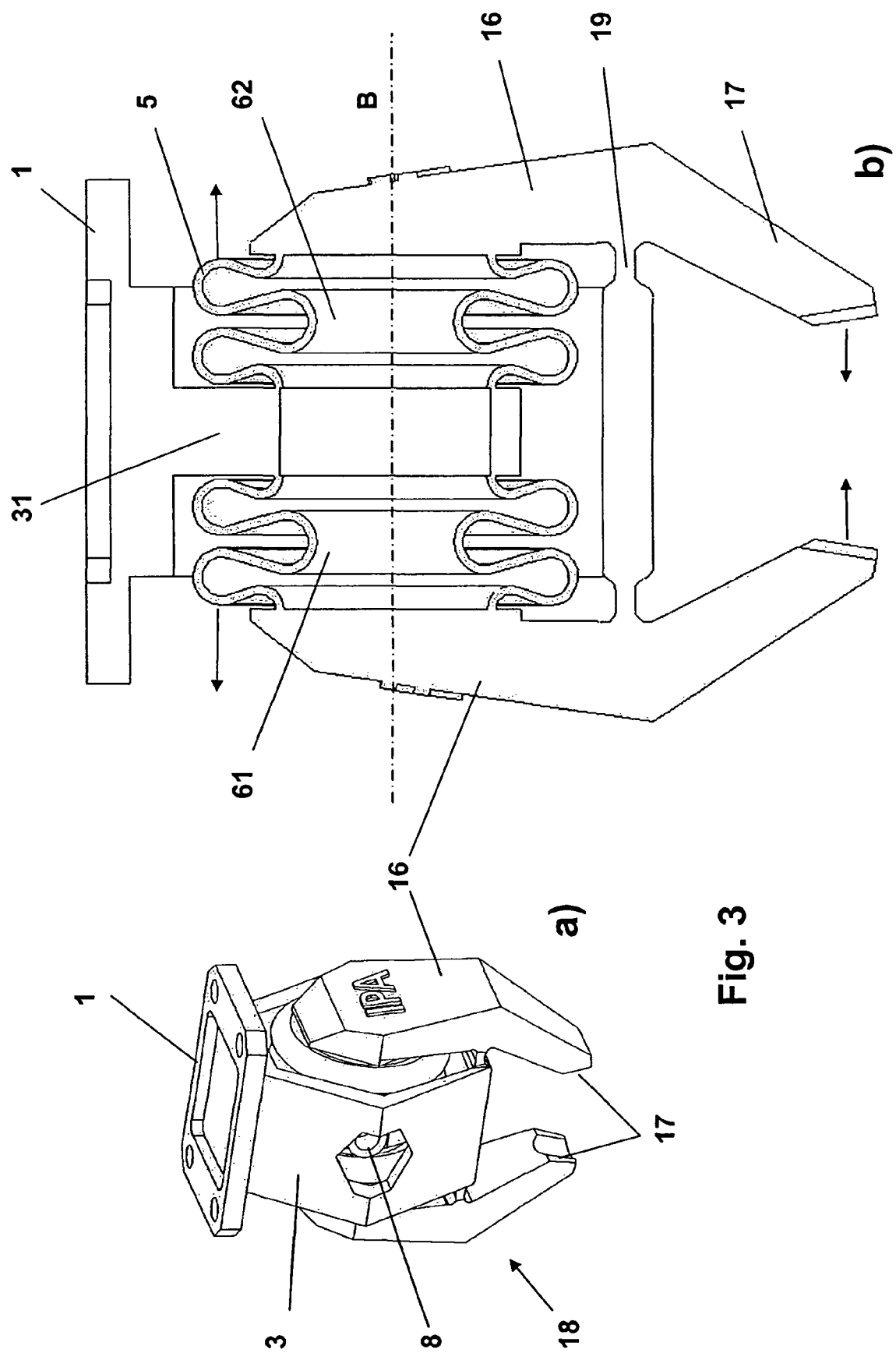
Figure 4:
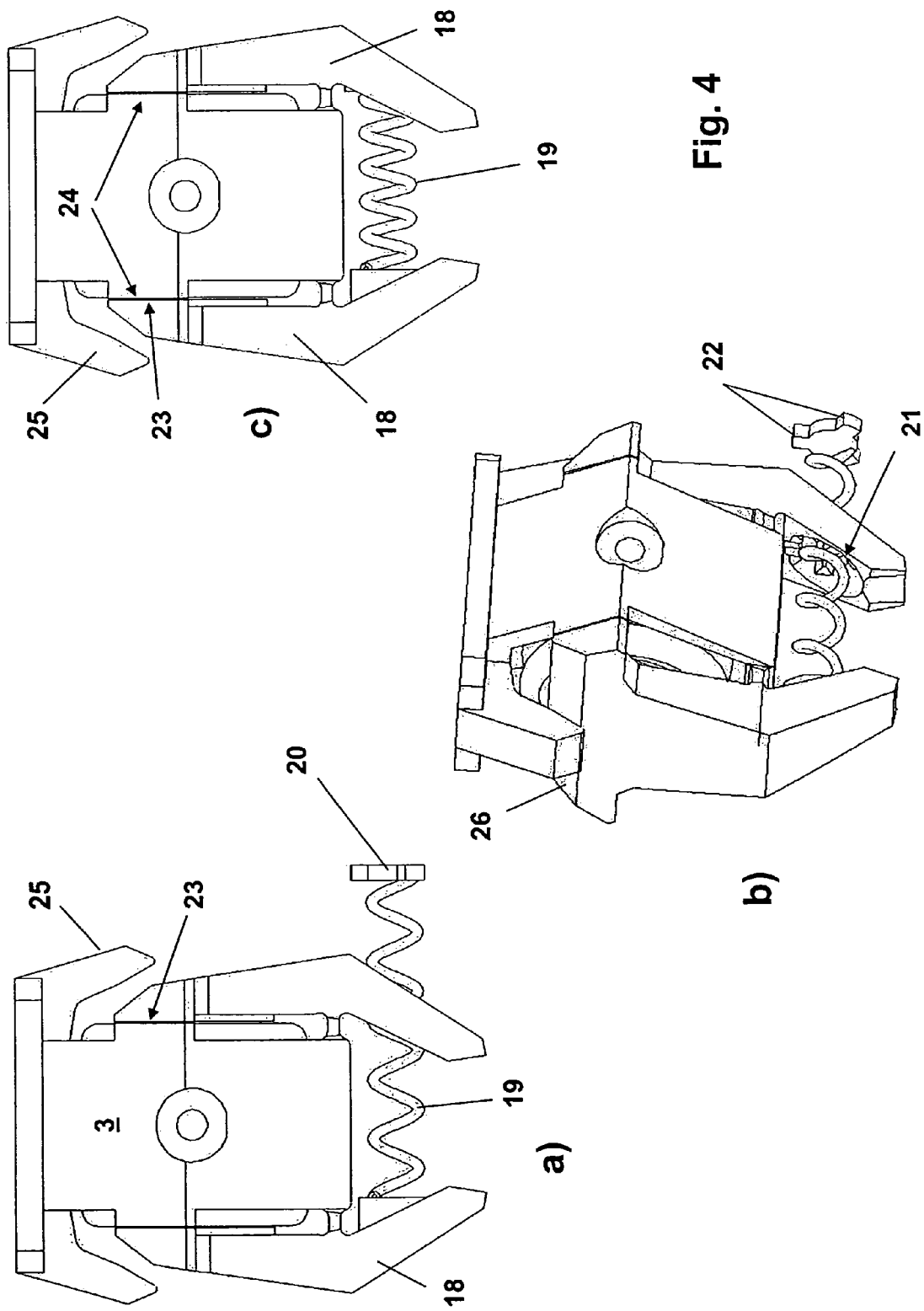

Shown are:
FIG. 1 a,b,c perspective illustrations and longitudinal section through a robot gripper with articulated units,
FIG. 2 a,b perspective illustrations of grippers according to FIG. 1 with gripper jaws, and
FIG. 3 a,b perspective illustrations and longitudinal section through a robot gripper with film joints.
FIGS. 4a, b, c perspective illustrations and longitudinal section through a robot gripper with a spring element.

MEANS FOR EMBODYING THE INVENTION, COMMERCIAL APPLICABILITY

In FIGS. 1a and b, a perspective illustration of a robot gripper is shown, which in FIG. 1c is shown in longitudinal section. The robot gripper has a fixing flange 1 on its upper end, via which the gripper can be detachably fixed with four fixing pins not shown, to a robot arm, also not shown. A frame 3 is provided in the shape of a yoke, integrally connected to the fixing device 1 which, as the other embodiments show, serves both as a mechanical counter-bearing and a mechanical guiding element as well as an articulated unit. Inside the space 4 spanned by the yoke-shaped frame 3 an actuator element 5 in the form of a bellows is provided, which encloses an inner volume 6 with a flexurally elastic wall 7. The flexurally elastic wall however, which in common with all other components of the robot gripper is preferably made from the same material, but has a very small wall thickness, has in longitudinal section (see illustration FIG. 1c) an undulating wall profile 7, the undulation of which defines a linear axis A along which the bellows-shaped actuator element is capable of expanding when filling the volume 6 with a medium, preferably with compressed air. To this end the bellows-shaped actuator element 5 has a connection line 8, via which the compressed air can be fed into the volume 6 of the bellows-shaped actuator element 5.

In FIG. 1c it is clear that the bellows-shaped actuator element is connected on one side to the frame 3, while on the other hand the other end of the bellows-shaped actuator element 5 is connected to a force transmission element 9. If compressed air is fed into the volume 6 of the bellows-shaped actuator element via the connection line 8, the actuator element 5 expands along the linear axis A, according to the illustration in FIG. 1c in a downwards direction. At the same time the upper part of the frame 3 serves as a mechanical counter-bearing for the actuator element 5 expanding along the linear axis A.

The force transmission element 9, which is provided on both sides with two guide grooves 10, moves linearly through the expanding actuator element 5 also in a downwards direction along the linear axis A, wherein the force transmission element 9 is guided by force through two lateral bounding edges 11 of the frame 3 along the linear axis A.

Additionally the frame 3 has two articulated units 12, about which connecting pieces 13 provided along a rotational axis D vertically intersecting the plane of the drawing in FIG. 1c are pivotably mounted. The connecting pieces 13 almost completely enclose the articulated shapes 12 provided on the frame side, such that together with the frame-sided articulated section 12 they form an encapsulated articulated unit, which is not detachable itself. In addition the connecting pieces 13 are each provided with a guide contour 14, which penetrate into the groove-shaped recesses 10 of the force transmission element 9, which causes the connecting pieces 13 when the force transmission element 9 is displaced vertically downwards along the linear axis to each be pivoted laterally outwards about the rotational axes D.

Gripper jaw elements (not shown in FIG. 1) suitably constructed according to the needs and purpose of the application can be mounted on the connecting pieces 13.

If by contrast the volume 6 of the actuator element 5 is evacuated, then a resetting spring force provided inside the flexurally elastic wall of the actuator element 5 causes the force transmission element 9 to be guided back along the linear axis A, i.e. driven upwards according to the illustration in FIG. 1c, by means of which finally the connecting pieces are pivoted together about the rotational axes D. This process corresponds to the grasping of an object placed between two gripper jaws.

In FIGS. 2a and b perspective drawings of a robot gripper according to the construction of the robot gripper described in FIG. 1 are shown, but having gripper jaws 15 which can either be produced integrally with the respective connecting pieces 13, or as already mentioned above, mounted retrospectively on the connecting pieces 13.

In FIG. 3a a perspective drawing of a further variant of a robot gripper is shown, for which a corresponding longitudinal section drawing is shown in FIG. 3b. By reference to FIG. 3b, which shows a longitudinal section drawing of a further variant of the robot-gripper, it can be seen that the fixing device 1, the frame 3, the actuator element 5 and the gripper jaw 18 consisting of lever arm 16 and gripper finger 17 are produced integrally. In contrast to the embodiment variant according to FIG. 1, the bellows-shaped actuator element is supported symmetrically on a central frame section 31 and is divided by this into two inter-communicating sub-volumes 61, 62. From the longitudinal section drawing according to FIG. 3b it is clear that during filling of the sub-volumes 61, 62 with compressed air via the connection line 8, both bellows-shaped actuator element halves are expanded outwards along the dashed linear axis B in the direction of the respective arrows. The ends of the bellows-shaped actuator element sections opposite the frame section 31 are rigidly connected to the lever arm 16 of the gripper jaw 8, which is respectively connected via a film joint 19 to a gripper finger 17. During the previously described movement of the actuator element parts in an outward direction the opposite gripper fingers 17 move towards each other, such that a controlled gripping process can thus take place. If by contrast the air is released from the inner sub-volumes 61, 62, both gripper fingers 17 open due to the returning spring force, which comes into effect inside the undulating, flexurally elastic walls of the actuator element parts. Ultimately the force and the velocity with which the gripper fingers 17 open depend on the inherent elastic returning force of the undulating wall material of the bellows-shaped actuator element 5 and on the inherent elastic returning force of the articulated zone in the form of a hinged film joint. A spreading apart of the gripper fingers 17 induced solely by the inherent elasticity of the bellows-shaped actuator element 5 may in some application cases take place too slowly, with too little force and also not to a definite end stop, so that for this purpose an additional advantageous embodiment has an additional force-generating element in the form of a spring element 19. FIGS. 4a to 4c illustrate a robot gripper constructed in this way. The spring element 19 is rigidly and integrally connected on one side to the left gripper jaw 18 in the illustration, without affecting the gripping function of the gripper finger 17. The other spring element end extends freely and additionally provides a support element 20. From the perspective drawing in FIG. 4b it is clear that the spring element 20 protrudes through a recess 21 in the other gripper jaw. On the recess 21, latches are provided into which the tab-shaped holding webs 22 on the support element 20 engage, when the spring element 19 is under tension and is serving as an element between both gripper jaws 18 which is spreading apart the gripper fingers 17 (see FIG. 4c). The pre-tensioning provided by the spring element 19 in the manner described thus serves to produce a faster resetting of the bellows-shaped actuator element 5 into a compressed condition after corresponding emptying of the medium by the connection line 8. Also, the spring element 19 is able to press the gripper jaws 18 with their upper side edges 23 against an end stop 24 provided on the frame side, thus guaranteeing a defined opened position of the gripper jaws. On the other hand the frame 3 provides stops 25 for limiting the movement of the gripper jaws for the closure process, against which each outer contour 26 of the gripper jaw 18 impinges during closure.

The gripper systems described above can be manufactured rapidly and with no assembly whatsoever directly from CAD data sets matched to a corresponding gripping task. They are thus in terms of overall costs very cost-effective compared to conventional systems on the market. It is of course also possible to manufacture other, alternative gripper constructions with the aid of generative production methods, so that the idea behind the invention is not limited exclusively to the exemplary embodiments described above.

LIST OF REFERENCE LABELS

1 Fixing flange
2 Fixing hole
3 Frame
4 Inner space
5 Bellows-shaped actuator element
6 Volume
61,62 Sub-volumes
7 Wall
8 Connection line
9 Force transmission element
10 Groove-shaped recess
11 Guide wall section
12 Articulated joint
13 Connecting piece
14 Guide contour
15 Gripper jaw
16 Lever arm
17 Gripper finger
18 Gripper jaw
19 Spring element
20 Support element
21 Latches
22 Holding webs
23 Side edge
24 End stop
25 Stop
26 Outer contour

The invention claimed is:

1. A robot gripper comprising:
a fixing flange for detachably attaching the robot gripper to a robot manipulator arm; and
at least one actuator element that is supported in a frame,
wherein the at least one actuator element actuates at least two gripper jaws of the robot gripper indirectly or directly kinematically via at least one articulated unit,
wherein at least the fixing flange, the frame and the at least one actuator element are manufactured integrally using a generative manufacturing method,
wherein the actuator element is shaped as a bellows, encloses an internal volume, which can be filled with a medium via at least one opening, and is capable of expanding, when filled with the medium, along a linear axis predetermined by the bellows design of the actuator element and of contracting, when the volume is emptied, in the opposite direction, and wherein the bellows-shaped actuator element is arranged symmetrically on a frame section and encloses two sub-volumes of the internal volume inter-communicating through the frame section, which when filled with the medium the sub-volumes expand along a common linear axis but in opposite directions, and that both sub-volumes, each facing away from the frame section, are operatively connected to a lever arm, which is respectively integrally joined via an articulated unit connected to the frame to a respective gripper jaw, which is pivotably mounted about a film joint.

2. The robot gripper according to claim 1, wherein the fixing flange, the frame and the actuator element are produced integrally from a uniform material.

3. The robot gripper according to claim 1, wherein the volume of the actuator element in the form of a bellows is enclosed by a flexurally elastic wall, which has an undulating wall profile in a longitudinal section, and a returning spring force opposite to the spatial direction along which the actuator element expands.

4. The robot gripper according to claim 1, wherein the articulated unit comprises the film joint.

5. The robot gripper according to claim 1, wherein the articulated units of both gripper jaws are connected via a frame section spacing both gripper jaws apart.

6. The robot gripper according to claim, 1, wherein the robot gripper comprises a CAD data set which can be supplied to a generative manufacturing method of one of the following kinds as production parameters:
- a rapid prototyping method;
- a photopolymerization by layered hardening from a liquid bath;
- a layered application and solidification of powder layers;
- a layered discharging of a binding agent into a powder compound;
- an energy beam deposition methods in metallic powders; and
- a plastic extrusion technology (FDM, Fused Deposition Modeling).

* * * * *